(12) United States Patent
Benesh et al.

(10) Patent No.: US 10,495,884 B2
(45) Date of Patent: *Dec. 3, 2019

(54) VISUAL PERCEPTION ENHANCEMENT OF DISPLAYED COLOR SYMBOLOGY

(71) Applicant: ELBIT SYSTEMS LTD., Haifa (IL)

(72) Inventors: Gil Benesh, Kiryat Tivon (IL); Yoav Ophir, Zichron Yaakov (IL)

(73) Assignee: Elbit Systems Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,952

(22) Filed: Nov. 9, 2018

(65) Prior Publication Data

US 2019/0094554 A1    Mar. 28, 2019

Related U.S. Application Data

(63) Continuation-in-part of application No. 15/535,633, filed as application No. PCT/IL2015/051206 on Dec. 13, 2015, now Pat. No. 10,126,554.

(30) Foreign Application Priority Data

Dec. 14, 2014  (IL) .......................................... 236243

(51) Int. Cl.
  *G02B 27/01*  (2006.01)
  *G06T 11/00*  (2006.01)
  *G06F 3/01*  (2006.01)

(52) U.S. Cl.
  CPC ....... *G02B 27/0172* (2013.01); *G02B 27/017* (2013.01); *G06F 3/013* (2013.01);

(Continued)

(58) Field of Classification Search
None
See application file for complete search history.

(56) References Cited

U.S. PATENT DOCUMENTS

2006/0034519 A1* 2/2006 Toyama ................... G06K 9/38
               382/224
2007/0192164 A1* 8/2007 Nong ..................... G06Q 30/02
               715/275

(Continued)

*Primary Examiner* — Jwalant Amin

(74) *Attorney, Agent, or Firm* — Meunier Carlin & Curfman LLC

(57) ABSTRACT

Method and system for enhancing visual perception of augmented reality presentation. Location and line-of-sight (LOS) of user wearing see-through head-mounted display (HMD) is detected. A background environment viewed through HMD is determined based on detected location and LOS. Color-attribute(s) of background environment at background location corresponding to user LOS is determined and compared with color-attribute(s) of foreground supplementary image to be displayed on HMD overlaid onto background environment at background location. When an incompatibility condition is detected, visual parameter(s) of supplementary image is adjusted to minimize incompatibility. Color-attribute determination may use information obtained from users previously at background environment, and may be based on user perception resulting from interactions of: geographic location, time when background environment viewed, and user LOS. Supplementary image may be displayed at alternate background location determined according to non-color characteristic of supplementary image. Supplementary image may be displayed according to physical characteristics of HMD display screen.

7 Claims, 7 Drawing Sheets

(52) U.S. Cl.
CPC .... *G06T 11/001* (2013.01); *G02B 2027/0112* (2013.01); *G02B 2027/0118* (2013.01); *G02B 2027/0181* (2013.01); *G02B 2027/0187* (2013.01); *G09G 2320/0666* (2013.01)

(56) References Cited

U.S. PATENT DOCUMENTS

| | | | |
|---|---|---|---|
| 2010/0201709 A1* | 8/2010 | Yang | H04N 5/58 345/629 |
| 2011/0066262 A1* | 3/2011 | Kelly | G05B 23/0267 700/90 |
| 2011/0279355 A1* | 11/2011 | Yasue | G02B 27/017 345/8 |
| 2013/0021373 A1* | 1/2013 | Vaught | G02B 27/017 345/633 |

* cited by examiner

VISUAL PERCEPTION ENHANCEMENT OF DISPLAYED COLOR SYMBOLOGY

CROSS-REFERENCE TO RELATED APPLICATIONS

This application is a continuation-in-part of U.S. patent application Ser. No. 15/535,633, filed on Jun. 13, 2017 and which is a US national stage entry of PCT International Application No. PCT/IL2015/051206 with an International Filing Date of Dec. 13, 2015, which claims priority to Israel Patent Application No. 236243, filed on Dec. 14, 2014, the entire contents of which are incorporated herein by reference.

FIELD OF THE INVENTION

The present invention relates to see-through displays and color image projection in general, and to the enhancement of visual perception on a see-through display in particular.

BACKGROUND OF THE INVENTION

A head-up display (HUD) is a transparent or see-through electronic display that presents visual information to a viewer without requiring the viewer to look away from his current viewpoint. The term HUD stems from a user, such as an aircraft pilot, being able to view information with his head positioned "up" and looking forward, instead of angled down looking at a lower instrumentation panel. HUDs can have a fixed display element, such as mounted to the cockpit of an aircraft. HUDs can also feature a display element that moves in conjunction with the position and orientation of the head of the user. HUDs with movable displays are also known as head-mounted displays or helmet mounted displays (HMDs)

A typical HUD contains three primary components: a projector unit, a combiner, and a video generation computer. The projection unit in a HUD is an optical collimator setup: a convex lens or concave mirror with a cathode ray tube, light emitting diode, or liquid crystal display at its focus. The combiner is typically an angled flat piece of glass located directly in front of the viewer. This flat piece of glass acts as a beam splitter and redirects the projected image to allow the viewer to see the background scene in his field of view simultaneously with the projected image. The computer interfaces with the projection unit of the HUD, and generates the imagery and symbology to be displayed by the projection unit. Typical aircraft HUDs display symbols or indicators representing flight data, such as: airspeed, altitude, a horizon line, heading, turn, bank, slip and skid parameters. In addition to real-time flight information, other types of symbols and data may also be presented on aircraft HUDs. For example, military applications include symbols representing weapon systems and sensor data, such as: target designation, closing velocity, range, launch acceptability, line of sight, and weapon status.

Often the color (or color-related properties) of the background environmental features visible through the HUD may conflict or interfere with the symbol to be displayed on the HUD superimposed onto the background view. For example, the particular color or other chromatic properties (e.g., hue, brightness, saturation) of the background region in combination with the particular color or other chromatic properties of the symbol, may cause problems or difficulties for the viewer to properly perceive the symbol relative to the background. In particular, the color combination may be such that it would be difficult to distinguish the symbol from the background, or that would result in a different color actually being perceived by the viewer different from the originally intended color of the symbol. In certain situations, the displayed symbology may be time-sensitive or otherwise of crucial importance to the viewer (e.g., an indication of real-time flight information), where adverse consequences may result if the displayed information is incorrectly perceived or improperly comprehended by the viewer.

U.S. Pat. No. 6,809,741 to Bates et al, entitled: "Automatic color contrast adjuster", discloses a color contrast adjuster that automatically selects and applies a new color combination for text and background based on the current color combination, if the current color combination is a problem color combination. The text can be any text object and the background can be any background object whose color can be determined. The color contrast adjuster can store multiple problem and preferred color combinations for each user, and can replace a problem color combination with a preferred color combination. The color contrast adjuster can provide example color combinations to a user, allow the user to select a better color combination, and add the preferred and problem combination to user preferences.

U.S. Pat. No. 7,184,063 to Shum et al, entitled: "Adaptive color schemes", discloses techniques for adaptive changing a displayed foreground color when a conflict between the displayed foreground color and an extracted background color is detected. Upon detection of such a conflict, a new foreground color is selected in accordance with a predetermined legibility condition. A color pool candidate may be considered to be a viable foreground color if a legibility value for the candidate color in relation to the extracted background color exceeds a predetermined legibility threshold value.

U.S. Patent Application No. 2012/0092369 to Kim et al, entitled: "Display apparatus and display method for improving visibility of augmented reality object", discloses improving the visibility of each augmented reality object by displaying each object differently from the background. The display apparatus and display method may improve the visibility by outputting a list of overlapped objects or a map of overlapped objects, or by enlarging a complex area in which objects are densely disposed, to reduce overlapping of the objects.

U.S. Patent Application No. 2012/0127198 to Gundavarapu, entitled: "Selection of foreground characteristics based on background", discloses a text colorization system that automatically sets the foreground text color based on one or more background colors over which the text is displayed. A text colorization system identifies a background color neighboring each pixel of a string of text. For each pixel region, the system selects a color to satisfy one or more colorization criteria. The system sets the text color at each region based on the selected color. The system then displays the layered image to the user, such as through a computer display or mobile device display.

U.S. Patent Application No. 2013/0147826 to Lamb, entitled: "Display of shadows via see-through display", discloses a method of operating a display device with a see-through screen. An image of an object is displayed on the display screen, while displaying an image of a shadow cast by the object onto the background scene. A location of the shadow is determined in an image of the background scene. An enhanced image of the background scene is rendered by increasing a relative brightness in a region adjacent to the shadow compared to the brightness within the shadow, and the enhanced image is displayed.

U.S. Patent Application No. 2013/0222424 to Morinaga et al, entitled: "Object display device and object display method", discloses a display device with a pattern extraction unit that extracts a region where an object is easily visually recognized when the object is overlaid and displayed in an image in real space, from the image in real space, based on information about the size and color of the object and about the color of the image in real space, acquired by an image analysis unit. A display position correction unit corrects the display position of the object to the region, to facilitate visual recognition of the object and enhance various effects, such as informativeness.

U.S. Patent Application No. 2013/0265232 to Yun et al, entitled: "Transparent display apparatus and method thereof", discloses a method and apparatus for displaying information on a transparent display such that the user can better discern the displayed elements in view of objects seen behind the transparent display. At least one sensor senses a position of an object and a position of a user. An area of the display through which the object is viewable by the user is determined, based on the positions of the object and of the user, and the information is displayed on the transparent display based on the determined area.

U.S. Patent Application No. 2007/0013495 to Suzuki et al, entitled: "Vehicle drive assist system", discloses a system for displaying lane markers indicating a travelling lane of the driver's vehicle, in a manner that allows better recognition of the lane markers under unfavorable environmental conditions. The system controller obtains lane information from various sources, such as an image of the road surface captured by a camera, temperature sensed by a thermistor, and snow conditions based on the sensed temperature and the slip rate indicated by an ABS unit. A sight line sensing system detects a view point position of the driver. An image of two lane guides, corresponding to opposite side edges of the travelling vehicle viewed from the view point of the driver through the vehicle front glass, is generated based on the detected view point position and obtained lane information. A display unit displays the image on or through the vehicle front glass. The background color at the lane guides (road surface) is detected, and the display color of the lane guides is set so as to increase the contrast relative to the detected background color.

U.S. Patent Application No. 2014/0253579 to Babaguchi, entitled: "Headup display, display method for headup display, and program for headup display", discloses a headup display (HUD) intended to improve visual recognizability while reflecting an original display color. Prescribed information initialized to a first display color is projected on a display board arranged in a user's gaze direction. A background color visually recognized by the user through the display board is detected. A first display color is adjusted based on the detected background color, and the prescribed information is displayed in the adjusted color. In particular, the first display color is adjusted to a second display color to correspond to the difference between the detected background color and the first display color, where the difference may represent the gradation difference or based on other color information. For example, the second display color may be obtained by mixing the first display color with the complementary color most easily visually recognizable with respect to the background color, where the mixing may be based on a calculated mixing ratio.

SUMMARY OF THE INVENTION

In accordance with one aspect of the present invention, there is thus provided a method for enhancing the visual perception of augmented reality presentation. The method includes the procedures of: detecting the location of a user, with a location measurement unit; and detecting the line-of-sight (LOS) of the user, with a line-of-sight detector. The method further includes the procedure of: determining a background environment viewed by the user through a see-through head-mounted display (HMD), based on at least the detected location and the detected LOS. The method further includes the procedure of determining at least one color-attribute of the background environment at a background location corresponding to a LOS of the user. The method further includes the procedure of comparing the determined color-attribute of the background environment with at least one color-attribute of a foreground supplementary image of a symbol, a text, or graphic or visual imagery, to be displayed on the HMD overlaid onto the view of the background environment at the background location. The method further includes the procedure of, when an incompatibility condition is detected between the determined color-attribute of the background environment and the color-attribute of the foreground supplementary image, adjusting at least one visual parameter of the supplementary image in a manner that minimizes the incompatibility condition, and displaying the supplementary image with the adjusted visual parameter on the HMD at the background location. The determined color-attribute of the background environment viewed by the user may be determined using information obtained from at least another see-through HMD viewed by another respective user present at the background location prior to the user. The information obtained from another HMD may include: the location of the another user; the LOS of the another user; and the color-attribute of the background environment viewed by the another user at a prior time. The determined color-attribute of the background environment viewed by the user may be determined based on the user perception of the background environment resulting from the interactions of: the geographic location of the background environment, the time at which the background environment is viewed, and the LOS of the user. Adjusting the visual parameter of the foreground supplementary image may include displaying at least a portion of the supplementary image at an alternate background location determined in accordance with at least one non-color characteristic of the supplementary image. The supplementary image with the adjusted visual parameter may be displayed in accordance with physical characteristics of the HMD display screen, such that the perceived color-attributes of the supplementary image as perceived through the HMD display screen is consistent with the intended color-attributes of the supplementary image. The displayed supplementary image may be adaptively modified in accordance with dynamic physical characteristics of the HMD display screen.

In accordance with another aspect of the present invention, there is thus provided a system for enhancing the visual perception of augmented reality presentation. The system includes a see-through head-mounted display (HMD) worn by a user, a location measurement unit, a line-of-sight detector, and a processor. The HMD is configured to enable the user to view a background environment, and to display foreground imagery overlaid onto the view of the background environment. The location measurement unit is configured to detect the location of the user. The line-of-sight detector is configured to detect the line-of-sight (LOS) of the user. The processor is configured to determine a background environment viewed by the user through the HMD, based on at least the detected location and the detected LOS. The processor is further configured to determine at least one color-attribute of the background environment at a background location corresponding to a LOS of the user. The processor is further configured to compare the determined color-attribute of the background environment at the background location with at least one color-attribute of a foreground supplementary image of a symbol, a text, or graphic or visual imagery, to be displayed on the HMD overlaid onto the view of the background environment at the background location. When an incompatibility condition is detected between the color-attribute of the background environment and the color-attribute of the foreground supplementary image, the processor is further configured to adjust at least one visual parameter of the supplementary image in a manner that minimizes the incompatibility condition, such that the supplementary image is displayed with the adjusted visual parameter on the HMD at the background location. The determined color-attribute of the background environment viewed by the user may be determined using information obtained from at least another see-through HMD viewed by another respective user present at the background location prior to the user. The information obtained from another HMD may include: the location of the another user; the LOS of the another user; and the color-attribute of the background environment viewed by the another user at a prior time. The determined color-attribute of the background environment viewed by the user may be determined based on the user perception of the background environment resulting from the interactions of: the geographic location of the background environment, the time at which the background environment is viewed, and the LOS of the user. Adjusting the visual parameter of the foreground supplementary image may include displaying at least a portion of the supplementary image at an alternate background location determined in accordance with at least one non-color characteristic of the supplementary image. The supplementary image with the adjusted visual parameter may be displayed in accordance with physical characteristics of the HMD display screen, such that the perceived color-attributes of the supplementary image as perceived through the HMD display screen is consistent with the intended color-attributes of the supplementary image. The displayed supplementary image may be adaptively modified in accordance with dynamic physical characteristics of the HMD display screen.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENTS

The present invention overcomes the disadvantages of the prior art by providing a system and method for enhancing the visual perception of displayed supplementary image content. The system detects when there is an incompatibility between the color-attributes of a symbol or other foreground supplementary image to be overlaid onto a see-through display, and the color-attributes of the background environment in the real world scene at the location where the symbol is to be displayed, the location corresponding to the line-of-sight of the viewer. The incompatibility may be a difficulty in perceiving or distinguishing the symbol from the background, or a differently perceived appearance of the symbol when overlaid onto the background. When an incompatibility is detected, the symbol is visually altered in a manner so as to minimize the incompatibility, such as by changing a color attribute of the symbol, and the visually altered symbol is projected onto the display. The system may obtain color information relating to the relevant background environment from images captured by a camera directed to the current field of view (FOV) of the user, or from previously acquired images captured by the same or other users or from a three-dimensional geographic model. The system may also obtain environmental information relating to the background environment, which may be taken into account in determining a potential color incompatibility. The system may further determine a potential color incompatibility associated with a future user location and line-of-sight, based on real-time location data of the user, real-time environmental information, and available images and image metadata.

Figure 1:
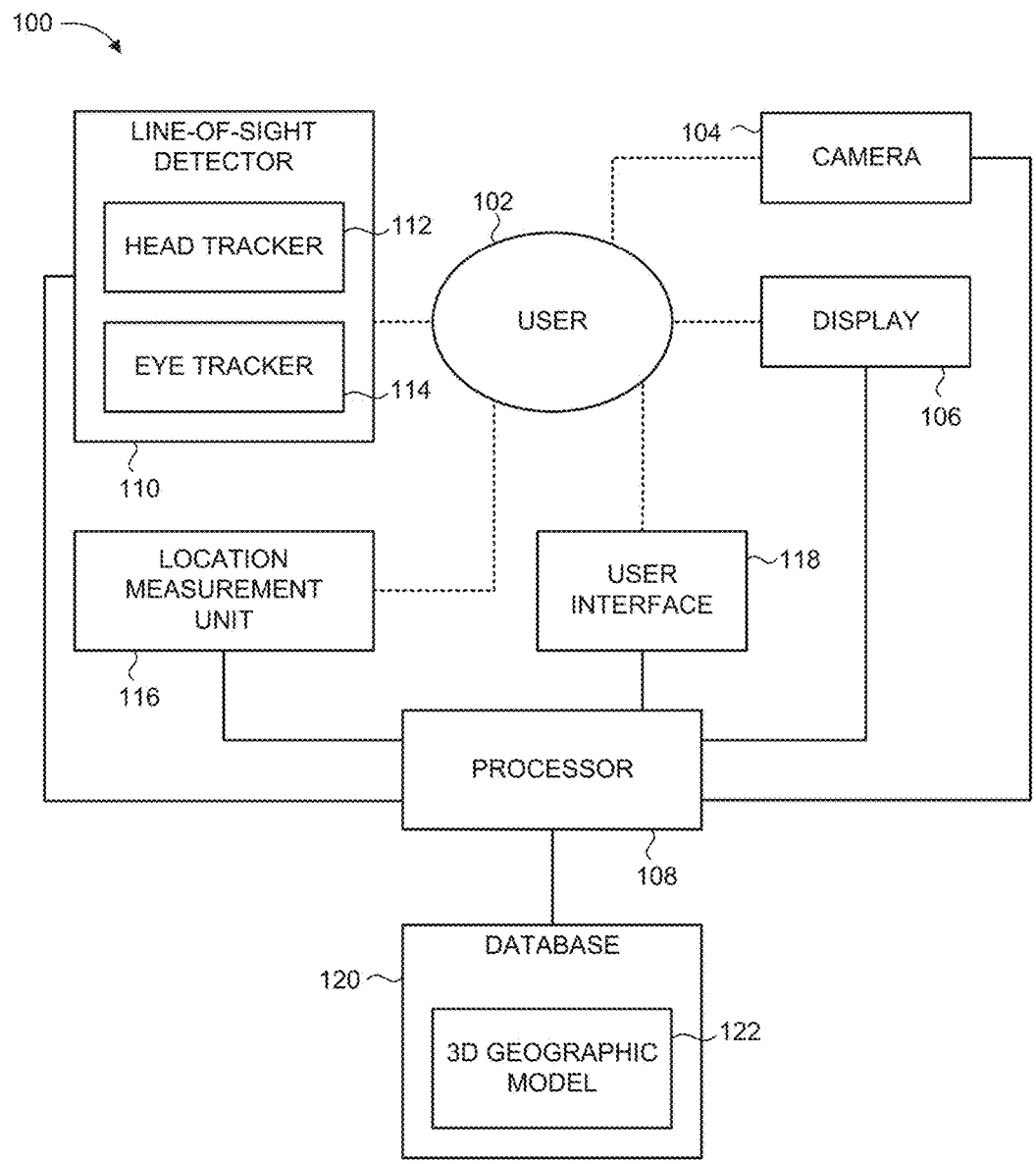
FIG. 1 is a schematic illustration of a system for enhancing the visual perception of augmented reality presentation, constructed and operative in accordance with an embodiment of the present invention.

Reference is now made to FIG. 1, which is a schematic illustration of a system, generally referenced 100, for enhancing the visual perception of augmented reality presentation, constructed and operative in accordance with an embodiment of the present invention. System 100 includes a camera 104, a display 106, a processor 108, a line-of-sight (LOS) detector 110, a location measurement unit 116, a user interface 118, and a database 120. LOS detector 110 includes a head tracker 112 and/or an eye tracker 114. Processor 108 is communicatively coupled with camera 104, with display 106, with LOS detector 110, with location measurement unit 116, with user interface 118, and with database 120.

Camera 104 is configured to acquire an image of a real-world scene being viewed by a user, referenced 102. Camera 104 may be mounted to or otherwise attached on or adjacent to the head (or other body part) of user 102, such as being affixed to a wearable head gear (e.g., a helmet, a headband, goggles, and the like) worn by user 102. Alternatively, camera 104 may be mounted in the vicinity of user 102, such as positioned on a stabilized platform, in an indoor or outdoor environment. For example, camera 104 may be an outward facing image sensor mounted within the cockpit of a vehicle or aircraft and operating at wavelengths that penetrate the cockpit windshield. Further alternatively, camera 104 may be held by user 102, or by another individual in the vicinity of user 102. In general, camera 104 is positioned such that the LOS of camera 104 is aligned toward the general direction in which the user 102 is facing, allowing camera 104 to capture images of the environment in the FOV of user 102. System 100 may include multiple cameras 104, such as a pair of cameras 104 configured to produce a stereoscopic image. System 100 may also include multiple cameras with different FOVs, allowing for imaging of a wider overall FOV than would be possible with a single camera.

Camera 104 may be any type of sensor device capable of acquiring and storing an image representation of a real-world scene, including the acquisition of any form of electromagnetic radiation at any range of wavelengths in which color information of the scene can be derived (including visible and non-visible wavelengths). For example, camera 104 may be a forward looking infrared (FLIR) camera with multicolor capabilities (e.g., a multicolor FPA), or may fuse multispectral image data. Camera 104 is operative to acquire at least one image frame, such as a sequence of consecutive image frames representing a video image, which may be converted into an electronic signal for subsequent processing and/or transmission. Accordingly, the term "image" as used herein refers to any form of output from an aforementioned image sensor, including any optical or digital representation of a scene acquired at any spectral region, and encompasses both a single image frame and a sequence of image frames (i.e., a "video image").

Display 106 is configured to display image content (e.g., a video image) to user 102. The displayed image may include primary image content, such as an image of a background environment viewable by user 102, as well as supplementary image content, such as symbology, text or other forms of graphical or visual imagery, where the supplementary image content is overlaid in the foreground onto the primary image content. Display 106 may be at least partially transparent (e.g., a "see-through" display), such that the user viewing display 106 can simultaneously observe images or other visual content superimposed onto the display along with a view of the physical environment through the display. A transparent display also provides the user with situational awareness of his environment. Display 106 may be a head-mounted display (HMD) that includes a display embedded within a wearable apparatus worn by user 102, such as a helmet, a headband, a visor, spectacles, goggles, and the like. Alternatively, display 106 may be another type of display, such as a head-up display (HUD), a portable or hand-held display, a display screen of a mobile computing device, and the like. Display 106 may include a projector that projects a video image onto a display screen viewable by user 102. The display optics can be positioned directly in the LOS of user 102 to provide a direct view of the projected (primary and supplementary) image content, or may be deviated from the LOS of user 102 to provide a glancing or peripheral view of the projected image content.

LOS detector 110 provides an indication of the general LOS of user 102, based on the position/orientation of the user's head and/or based on the eye gaze direction of the user. LOS detector 110 includes at least one of: head tracker 112 and eye tracker 114. Head tracker 112 is configured to determine (e.g., in real-time) the direction of the head of user 102, such as via head-tracking devices or mechanisms known in the art. Eye tracker 114 is configured to determine (e.g., in real-time) the eye gaze direction of user 102, for example by determining the position of the center of the pupil with respect to the cornea or eyelids, such as via eye-tracking devices and mechanisms known in the art.

Location measurement unit (LMU) 116 provides an indication of the real-world location of user 102 and/or the real-world location of the scene that is currently being viewed by user 102. For example, LMU 116 determines the global position and orientation coordinates of user 102 with respect to a reference coordinate system. LMU 116 may be embodied by one or more devices or instruments configured to measure the position and orientation (viewing direction) of user 102, such as: a global positioning system (GPS); a compass; an inertial navigation system (INS); an inertial measurement unit (IMU); motion sensors or rotational sensors (e.g., accelerometers, gyroscopes, magnetometers); a rangefinder; and the like.

User interface 118 allows user 102, or another user of system 100, to control various parameters or settings associated with the components of system 100. For example, user interface 118 can allow user 102 to adjust parameters or settings of camera 104 (e.g., shift or rotate camera LOS, increase/decrease resolution level, zoom in/out, etc) and/or parameters or settings of display 106 (e.g., shifting focus or FOV of the displayed image). User interface 118 may include a cursor or touch-screen menu interface, and/or voice recognition capabilities for allowing user 102 to enter instructions or data by means of speech commands.

Database 120 provides storage of image frames and other types of data relevant to the operation of system 100. Database 120 includes a collection of background images of real-world environments, such as at least an environment in which user 102 is expected to be located. For example, if user 102 is an aircraft pilot, then database 120 may include images of the area surrounding the runways and landing gates of different airports. The background images may be provided by a 3D geographic model 122 that includes a three-dimensional representation of the Earth or of a particular area, region or territory of interest. 3D model 122 generally includes imagery and texture data relating to geographical features and terrain, including artificial features (e.g., buildings, monuments, and the like), such as the location coordinates of such features and different views thereof (e.g., acquired via satellite imagery or aerial photography, and/or street level views). For example, 3D model 122 can provide a plurality of visual representations of the geographical terrain of a region of interest at different positions and viewing angles (e.g., by allowing manipulation operations such as zooming, rotating, tilting, etc). 3D model 122 may include a proprietary and/or publically accessible model (e.g., via open-source platforms), or may include a model that is at least partially private or restricted. Database 120 may include actual background images and/or image data that allows for the reconstruction or analysis of relevant background scenes. Database 120 may include preloaded imagery, such as images that were previously captured by camera 104. Database 120 may also store exemplary supplementary image content (e.g., symbology, text, graphic and visual designs), to be displayed overlaid on the view of different real-world scenes.

Processor 108 receives instructions and data from the components of system 100. Processor 108 performs any necessary image processing on the image frames (acquired by camera 104 or retrieved from database 120) and generates a final symbol image for displaying on display 106. Processor 108 may be situated at a remote location from the other components of system 100. For example, processor 108 may be part of a server, such as a remote computer or remote computing system or machine, which is accessible over a communications medium or network. Alternatively, processor 108 may be situated in the vicinity of user 102 and/or integrated within other components of system 100. For example, processor 108 may be coupled to components of system 100 via a wireless connection, or processor 108 may be incorporated with a computer associated with camera 104 and/or display 106.

The components of system 100 may be based in hardware, software, or combinations thereof. It is appreciated that the functionality associated with each individual component of system 100 may be distributed among multiple components, which may reside at a single location or at multiple locations. For example, the functionality associated with processor 108 may be distributed between multiple processing units (such as a dedicated image processor for the image processing functions). System 100 may optionally include and/or be associated with additional components not shown in FIG. 1, for enabling the implementation of the disclosed subject matter. For example, system 100 may include a power supply (not shown) for providing power to the various components, and may further include an additional memory or storage unit (not shown) for temporary storage of image frames or other types of data. It is noted that some of the components of system 100 are optional. For example, in one embodiment of the present invention (discussed further hereinbelow), system 100 does not include (or at least does not utilize) camera 104.

Figure 2A:
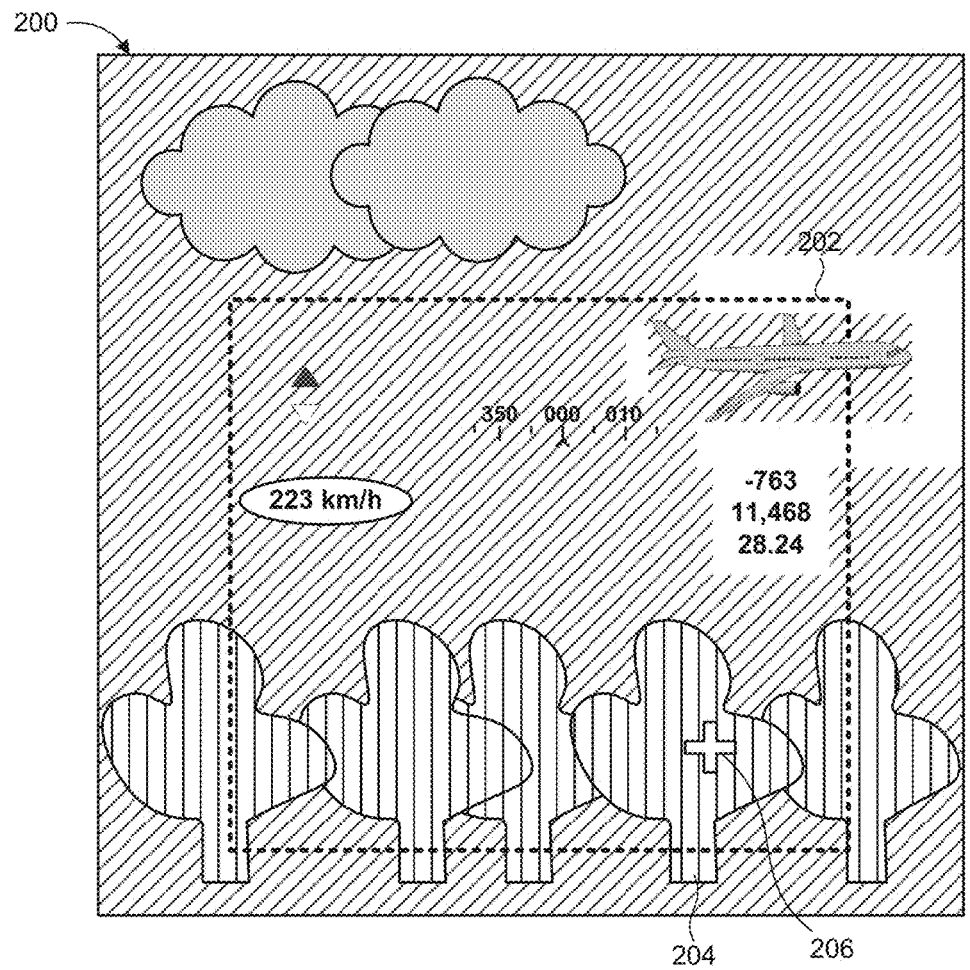
FIG. 2A is a schematic illustration of an exemplary view of a scene, as viewed through the display of FIG. 1, operative in accordance with an embodiment of the present invention.

The operation of system 100 will now be discussed, for exemplary purposes, in the context of a pilot operating an aircraft. The pilot will be considered herein as a user 102 of system 100. Reference is now made to FIG. 2A, which is a schematic illustration of an exemplary view of a scene, referenced 200, as viewed through the display 106 of FIG. 1, operative in accordance with an embodiment of the present invention. In the example of FIG. 2A, user 102 is wearing a head-mounted display (HMD) 106, through which user 102 views a real-world scene 200. Scene 200 includes various environmental features, such as clouds, trees, and another aircraft. The environmental features include at least one selected object 204 (represented for exemplary purposes by one of the trees), on which a symbol or other supplementary imagery is to be superimposed in order to present relevant information about the selected object 204 to the user 102. For example, the supplementary image may be a symbol 206 (represented for exemplary purposes as a cross), such as in order to indicate to user 102 that tree 204 represents a current target. Display 106 also presents additional supplementary content overlaid onto the background view of scene 200, such as relevant real-time flight information (e.g., indications of: airspeed; aircraft heading; climbing/descent rate; altitude; barometric reading; etc).

Figure 2B:
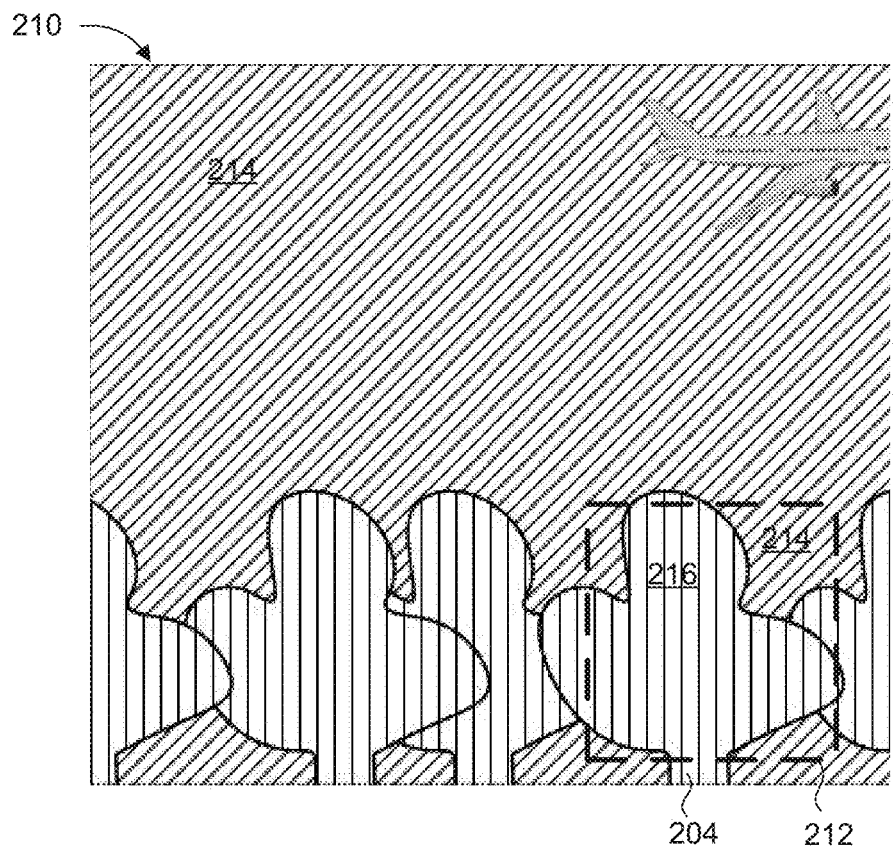
FIG. 2B is a schematic illustration of an exemplary image of the scene of FIG. 2A, operative in accordance with an embodiment of the present invention.

In the course of the aircraft's flight, camera 104 captures at least one image of an image region 202 of scene 200. Reference is made to FIG. 2B, which is a schematic illustration of an exemplary image, generally referenced 210, of the scene of FIG. 2A, operative in accordance with an embodiment of the present invention. The camera image 210 may be converted to a digital signal representation of the captured scene, such as in terms of pixel values, which are forwarded to processor 108. Processor 108 proceeds to analyze image 210, in terms of the color characteristics of the intended symbol to be superimposed onto selected object 204 on HMD 106. In particular, processor 108 compares the color-attributes of the environmental features of scene 200 located within the vicinity of object 204, indicated by image region 212, with the color-attributes of the intended symbol 206. The color-attributes may include at least one of: color value, brightness, hue, saturation, chromaticity, radiance, luminance, and/or any other relevant characteristic or attribute that may affect the visual perception of a viewer. In image 210, a color-attribute of one image portion is depicted by shading pattern 214, while a color-attribute of another image portion is depicted by shading pattern 216.

Figure 3A:
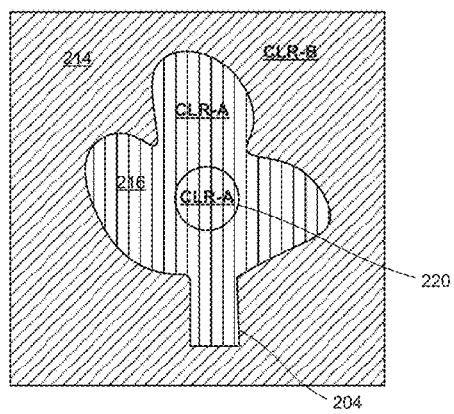
FIG. 3A is a schematic illustration of an initial unaltered symbol overlaid onto the selected object in the view of FIG. 2A, operative in accordance with an embodiment of the present invention.

Reference is made to FIG. 3A, which is a schematic illustration of an initial unaltered symbol, referenced 220, overlaid onto the selected object 204 in the view of FIG. 2A, operative in accordance with an embodiment of the present invention. Symbol 220 is represented for exemplary purposes as a circle. The image region 216 of object 204 is characterized by at least a first color-attribute, designated "CLR-A", whereas the image region 214 surrounding object 204 is characterized by at least a second color-attribute, designated "CLR-B". The initial symbol 220 is characterized by at least the first color-attribute CLR-A.

Processor 108 compares the color-attributes of symbol 220 and the surrounding image region 216, and determines whether these color-attributes are incompatible with one another. In particular, processor 108 determines if the set of color attributes of object 204 in image region 216 combined with the set of color attributes of symbol 220 result in an incompatibility condition. The term "incompatibility condition" is defined herein as any condition that may substantially hinder or detract from the visual perception of the foreground image (i.e., symbol 220) when displayed overlaid on the background environment (i.e., object 204), such as for example, a difficulty in clearly distinguishing between the two images. For example, an incompatibility condition may be if there is insufficient contrast between the foreground image and the background environment as perceived by the user, or if there is an excess discrepancy between the color appearance of the foreground image when projected onto the background environment, compared to the appearance of the intended color on a nominal achromatic background, as perceived by the user. Another example of an incompatibility condition is the presence of visual distortions in the appearance of the foreground image when projected onto the background environment, as perceived by the user (e.g., blurriness, chromatic aberrations). A further example of an incompatibility condition is a non-uniform appearance of at least one color-attribute of the foreground image when projected onto the background environment, as perceived by the user.

In the case shown in FIG. 3A, both image region 216 and symbol 220 have a common color-attribute (CLR-A), and are thus deemed incompatible. While a single color-attribute of each image is used here for illustrating the comparison, in general a series of attributes of each image (such as: color value, brightness, hue, saturation, chromaticity) is taken into account when determining if an incompatibility exists. For example, object 204 and symbol 220 may both be substantially the same color, such as blue, or similar shades of blue (e.g., a blue symbol to be displayed overlaid onto a background of a blue sky or a body of water), resulting in a difficultly in distinguishing the symbol from the background. For another example, symbol 220 may be a color that clashes with or obscures object 204 when overlaid thereon, such as a blue symbol on a green background. For a further example, the brightness level of symbol 220 may be such that it would be difficult to perceive symbol 220 when overlaid onto a substantially light color (e.g., white or yellow) of object 204.

Figure 3B:
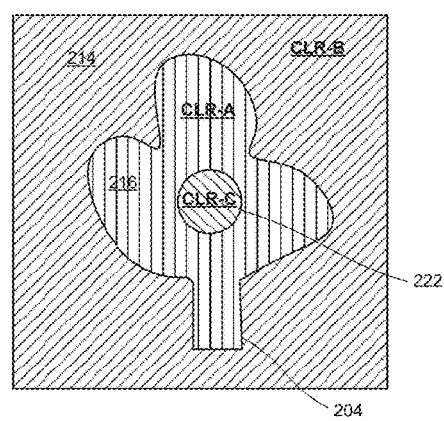
FIG. 3B is a schematic illustration of the overlaid symbol of FIG. 3A after a first exemplary visual alteration, operative in accordance with an embodiment of the present invention.
Figure 3C:
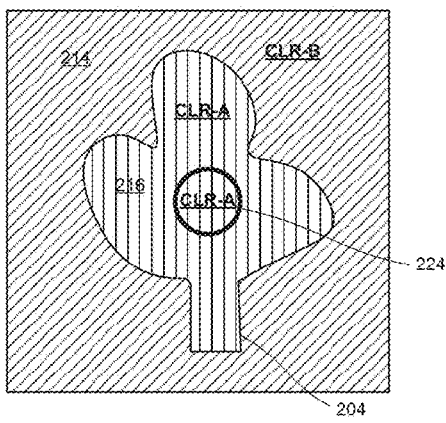
FIG. 3C is a schematic illustration of the overlaid symbol of FIG. 3A after a second exemplary visual alteration, operative in accordance with another embodiment of the present invention.
Figure 3D:
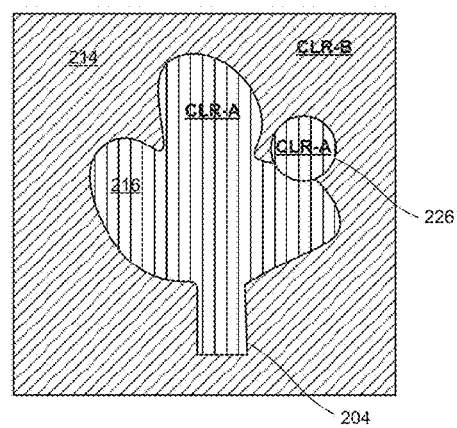
FIG. 3D is a schematic illustration of the overlaid symbol of FIG. 3A after a third exemplary visual alteration, operative in accordance with a further embodiment of the present invention.

After determining that the color-attributes of symbol 220 and surrounding image region 216 are incompatible, processor 108 proceeds to determine at least one visual alteration of symbol 220 that would substantially minimize or eliminate the incompatibility. Symbol 220 is then visually altered in such a manner and projected onto display 106. Reference is now made to FIGS. 3B, 3C and 3D. FIG. 3B is a schematic illustration of the overlaid symbol 220 of FIG. 3A after a first exemplary visual alteration, referenced 222, operative in accordance with an embodiment of the present invention. FIG. 3C is a schematic illustration of the overlaid symbol 220 of FIG. 3A after a second exemplary visual alteration, referenced 224, operative in accordance with another embodiment of the present invention. FIG. 3D is a schematic illustration of the overlaid symbol 220 of FIG. 3A after a third exemplary visual alteration, referenced 226, operative in accordance with a further embodiment of the present invention. Referring to FIG. 3B, symbol 222 is projected with a new color-attribute, designated "CLR-C", that is different than its initial color-attribute CLR-A. For example, if image region 216 is a green background and the initial symbol 220 is also green, then altered symbol 222 may be projected in an orange or yellow color instead. Referring to FIG. 3C, symbol 224 is projected onto object 204 with a bolded contour or a different colored contour, in order to visually differentiate symbol 224 from object 204. For example, if image region 216 was a green background and the initial symbol 220 was also green, then the interior of altered symbol 224 remains substantially green, but the border region of symbol 224 is highlighted, such as by projecting a bolded contour, or a different colored contour (e.g., orange or yellow), such as to produce a "halo" visual effect. Referring to FIG. 3D, symbol 226 is projected onto a different image location on display 106, that is different from the image location on which symbol 220 was intended to be projected (FIG. 3A). For example, if image region 216 and initial symbol 220 were both green, and if symbol 220 was initially intended to be projected overlaid substantially in the center of object 204, then altered symbol 226 is alternatively projected in a shifted location with respect to object 204. In particular, symbol 226 is shifted toward the upper right from the center of object 204, such that the majority of the (e.g., green) symbol 226 is overlaid onto the (e.g., white) background of image region 214 adjacent to object 204, rather than onto the (e.g., green) background of image region 216 where an incompatibility exists.

It is appreciated that symbol 220 may undergo additional types of visual manipulations and alterations, including but not limited to: translational and/or rotational shifts; changes in size (i.e., increasing or decreasing the size of symbol 220 relative to object 204); change in shape (e.g., changing a circular symbol into a triangle or a diamond or a cross); altering the shading or intensity of the initial color; adjusting a color-related parameter (e.g., brightness/hue/saturation/luminance/radiance); emphasizing or highlighting at least a portion of the symbol; omitting at least a portion of the symbol; changing the type of symbol entirely; and any combination thereof. In general, the visual alteration of symbol 220 may be such that the perception of the altered symbol (222, 224, 226) by user 102 will closely resemble the intended perception of the initial symbol 220 as much as possible (while minimizing the incompatibility). For example, if the initial symbol was intended to be green, and is intended to be projected onto a blue background, resulting in a difficulty in distinguishing the symbol from the background (insufficient contrast), then a yellow symbol may be projected instead, resulting in a green symbol being perceived due to the color combination of yellow with blue.

Processor 108 may also take into consideration the line-of-sight of user 102, as determined using LOS detector 110, when performing the color analysis of image 210, such as for identifying relevant background image regions (214, 216) over which to potentially display the intended symbol. For example, the visually altered symbol (222, 224, 226) is projected onto display 106 at a location that conforms with the current LOS of user 102.

Figure 4A:
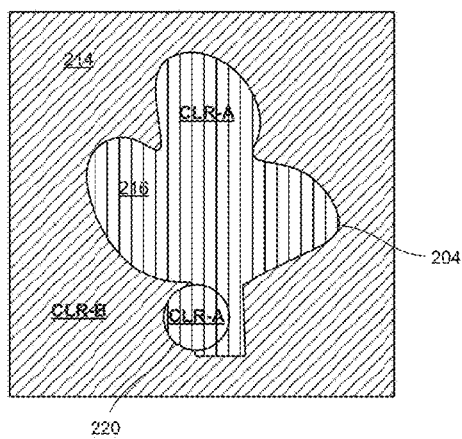
FIG. 4A is a schematic illustration of an initial unaltered symbol partially overlaid onto the selected object in the view of FIG. 2A, operative in accordance with another embodiment of the present invention.
Figure 4B:
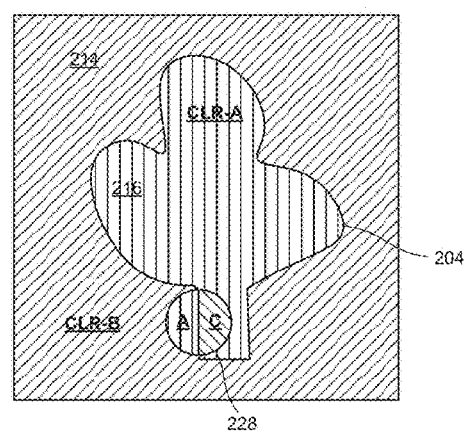
FIG. 4B is a schematic illustration of the overlaid symbol of FIG. 4A after an exemplary visual alteration, operative in accordance with another embodiment of the present invention.

In some cases, only a portion of the initial symbol may be altered, while the other portion of the initial symbol remains the same. Reference is now made to FIGS. 4A and 4B. FIG. 4A is a schematic illustration of an initial unaltered symbol 220, partially overlaid onto the selected object 204 in the view of FIG. 2A, operative in accordance with another embodiment of the present invention. FIG. 4B is a schematic illustration of the overlaid symbol of FIG. 4A after an exemplary visual alteration, referenced 228, operative in accordance with another embodiment of the present invention. In FIG. 4A, a portion of the initial symbol 220 is intended to be overlaid over the image region 216 of object 204, while the remaining portion of symbol 220 is intended to be overlaid over the image region 214 external to object 204. Therefore, an incompatibility condition only exists with the portion of symbol 220 (e.g., the right half) overlaid onto image region 216, since both are characterized by a common color-attribute "CLR-A", whereas there is no incompatibility condition with the other portion (e.g., the left half) of symbol 220. Thus, in FIG. 4B, altered symbol 228 is projected such that the portion overlaid onto image region 216 (within object 204) is changed to a different color-attribute ("CLR-C") than the color-attribute ("CLR-A") of object 204, while the portion overlaid onto image region 214 (beyond object 204) is kept with the same color-attribute ("CLR-A") that already differs from the color-attribute ("CLR-B") of image region 214. For example, if image region 216 and initial symbol 220 were both green, while image region 214 was white, then the right-half of altered symbol 228 may be projected in an orange or yellow color while the left-half of symbol 228 is kept green.

According to an alternative embodiment of the present invention, the comparison of the color-attributes of the intended symbol and of the surrounding environmental features of scene 200 (where the symbol is to be projected on display 106) may be performed based on information of real-world scene 200 obtained by other means, rather than based on an image acquired by camera 104. In particular, system 100 may generate a synthetic image of scene 200 using 3D geographic model 122, in conjunction with an indication of the particular scene 200 provided by the line-of-sight of user 102 (obtained from LOS detector 110) and the real-world location of user 102 (obtained from LMU 116). For example, processor 108 receives the current global position and orientation coordinates of user 102 from LMU 116, and receives the current head direction and/or eye gaze direction of user 102 from LOS detector 110. Based on the obtained information, processor 108 determines that user 102 is currently at a particular location (e.g., approaching the landing region of a particular airport), and is currently viewing a particular scene at that location (e.g., viewing a section of a landing runway at the airport), based on his position/orientation coordinates and head direction/eye gaze direction. Processor 108 may then retrieve at least one (color) image of the determined currently viewed scene from the collection of images contained in 3D geographic model 122, or may generate the image(s) of the determined scene based on relevant information contained in 3D geographic model 122. Processor 108 then proceeds to analyze the 3D model-based image, to compare the color-attributes of the intended symbol (220) with the color-attributes of an image location (216) where symbol 220 is to be displayed, and to determine if an incompatibility condition exists, as described hereinabove with reference to FIGS. 2A and 2B. It is noted that processor 108 may alternatively perform the determination of an incompatibility condition without necessarily analyzing a synthetic image of scene 200, but rather by utilizing only relevant information obtained from 3D model 122, such as by directly obtaining the color-attributes of background region 214, 216 from 3D model 122. In general, the comparison of color-attributes and/or determination of an incompatibility condition may be implemented in any suitable manner, using any suitable processing technique or process, such as in order to optimize processing efficiency.

Further alternatively, the determination of an incompatibility condition between the color-attributes of the intended symbol (220) and the background region (216) may be performed based on both a camera image (210) in addition to a synthetic image (generated using information provided by LOS detector 110, LMU 116 and 3D model 122). For example, processor 108 may perform a first comparison of the color-attributes of symbol 220 and background region 216 in the camera image 210, and then perform a second comparison of the color-attributes of symbol 220 and background region 216 as they appear in the synthetic image. Processor 108 then assigns a differential weighting or qualitative value to each comparison (e.g., 70% for the camera image and 30% for the synthetic image), and determines the existence of an incompatibility condition accordingly. The weighting scheme for each comparison may be adaptive, such as being updated based on real-time data (e.g., increasing the qualitative value of the camera image relative to the synthetic image when a higher resolution camera is substituted) or historical analysis (e.g., determining the success rate of previous comparisons using suitable metrics).

According to a further embodiment of the present invention, the comparison of color-attributes and/or determination of an incompatibility condition may be personalized in accordance with the specific visual perception characteristics of different users. For example, system 100 may store information in database 120 associating individual users with their own set of color perception characteristics and other relevant information, which may subsequently be taken into account when determining the existence of an incompatibility condition for that particular user. For example, a pair of users may perceive a certain color (or a certain set of color characteristics) in such a way that a given foreground color overlaid on a given background would be incompatible for the first user, but would not be considered incompatible for the second user. Each user of system 100 may be linked to a unique identifier, which is used for identification and authentication of the user during an initialization stage, such that system 100 retrieves the necessary information associated with the provided user identifier. The user perception characteristics may be obtained based on user feedback, such as by the user being presented with a simulation of various color patterns and color combinations and providing relevant responses to the simulation, or user feedback relating to his/her perception of previous visually altered (or non-altered) foreground images displayed by system 100 (i.e., historical performance data). System 100 may implement artificial intelligence techniques, such as machine learning and pattern recognition, in order to learn over time how different users perceive different color combinations. For example, system 100 may implement a probabilistic model for different color patterns or color combinations during an initial training stage, based on user feedback to the color simulation, such as using a Hidden Markov model. The personalized user information may also incorporate an analysis of the user's eye(s), such as obtained via eye tracker 114.

System 100 may also display a respective (visually altered) symbol to multiple users (102A, 102B, 102C) simultaneously, in accordance with the respective visual perception characteristics and the respective LOS of each user 102. For example, processor 108 may obtain user perception characteristics associated with the pilot (102A) and co-pilot (102B) of an aircraft, and receive an indication of the LOS of the pilot 102A and co-pilot 102B with respect to the background scene 200 as viewed through respective displays (106A, 106B). Processor 108 then determines a first background region 216A linked to the LOS of the pilot 102A, and a second background region 216B linked to the LOS of the co-pilot 102B. Finally, processor 108 determines if an incompatibility condition exists with respect to the intended symbol to be displayed for each user (pilot 102A and co-pilot 102B), and visually alters the respective symbols as applicable. In particular, processor 108 compares the color-attributes of a first symbol (220A) intended to be displayed to the pilot 102A, with the color-attributes of the first background region 216A linked to the LOS of pilot 102A, and displays a visual altered form (222A) of the first symbol 220A on the pilot display 106A if an incompatibility is detected. Correspondingly, processor 108 compares the color-attributes of a second symbol (220B) intended to be displayed to the co-pilot 102B, with the color-attributes of the second background region 216B linked to the LOS of the co-pilot 102B, and displays a visual altered form (222B) of the second symbol 220B on the co-pilot display 106B if an incompatibility is detected.

The analysis of color-attributes to determine a potential incompatibility condition may optionally take into account additional information, such as the ambient light conditions present in scene 200, which may influence how different color combinations may be perceived. For example, camera 104 and/or a dedicated ambient light detector of system 100 (not shown in FIG. 1) may provide an indication of the level of ambient light in scene 200, particularly in the vicinity of the selected object 204 on which a symbol 206 is to be overlaid on display 106. The amount or intensity of light received by the ambient light detector may be a function of the time of day, season, climate, topography, geography, and various other factors, which also may be taken into consideration. For example, the ambient light detector will likely detect less light during the night than during the day. The ambient light detector may be embodied by a photodetector (e.g., a photodiode) or any other type of sensor operative to detect light in the visible range. The level of ambient light in scene 200 may also be obtained from the camera image 210. It is noted that the ambient light (and/or other relevant environmental conditions) of scene 200 may be included as applicable in the color analysis and determination of a potential incompatibility condition, regardless of whether the color analysis is performed based on an image captured by camera 104 or based on an image retrieved from database 120.

It is noted that the visually altered symbol projected on display 106 may be updated in real-time based on changing conditions and circumstances. Accordingly, camera 104 may continue capturing additional images of scene 200, and processor 108 monitors the color-attributes of the relevant background environments (e.g., image regions 214, 216) in successive images, with respect to the relevant foreground images, to determine if the foreground images need to be updated. For example, if the background environment changes, resulting in a new incompatibility condition between the color-attribute of the visually altered symbol and the color-attribute of the new background environment where the symbol is overlaid, then the symbol may undergo a further visual alteration (in order to minimize the new incompatibility). If the changed background environment is such that there would not be an incompatibility condition with respect to the initial intended symbol (220), then the visually altered symbol (222, 224, 226) may be changed back to the initial symbol (220) to be displayed.

Database 120 may be an adaptive and dynamic database, which is continuously updating the collection of images in accordance with new information and changing environmental conditions. Database 120 may obtain images of real-world environments from different users 102 worldwide, who may be authorized to upload images directly and/or to modify or delete existing images in database 120. For example, a series of images captured by a multitude of users with respective cameras may be uploaded to database 120, where different users 102 provide distinct images of the same general location, each set of images being characterized by different imaging parameters (e.g., different viewing angles, focal lengths, FOVs, lighting conditions, resolution levels, and the like). The entire collection of images may eventually form panoramic views of various real-world environments from different positions and angles, such as a series of street-level panoramic views. The images captured by different users 102 may be uploaded to database 120 substantially in real-time. System 100 may send out requests to different users to provide images with selected criteria, such as of geographic locations where few (or no) images are currently available in database 120, or images of environments captured at particular imaging perspectives and/or lighting conditions. The images provided to database 120 may include metadata (i.e., a "tag"), for assisting identification and classification of the images. For example, images in database 120 may be categorized and searchable according to different criteria (e.g., geographic location of scene; perspective or viewing angle of image; lighting and weather conditions when image was captured; time of day of image capture; personal information of user that provided the image; and the like). Processor 108 may also select for color analysis an optimal background image (or images) from database 120 that meets the image criteria (defined by system 100 or provided by user 102). Database 120 may also contain images that are available for limited time periods, such as images associated with a particular event or occasion. Accordingly, the database images may also include temporal metadata, indicating the time (and location) of the particular event associated with the image content. For example, images may be uploaded to database 120 of a stadium or arena at which a concert or sporting event is taking place, such that those images are only accessed (i.e., for color analysis and determination of a potential incompatibility condition) for users who are present at that concert or sporting event. Users 102 may also provide feedback relating to the images contained in database 120 and/or to visually altered symbols (222, 224, 226) generated by system 100. For example, user feedback may include comments or qualitative ratings of different types of visual alterations generated by system 100.

The color-attributes may be determined and processed using information obtained from one or more other users previously present at the relevant location. For example, a first user may view a background environment through an HMD 116 of his respective system 100 at a first time period. The information relating to the viewed background environment may be used to modify a symbol to be displayed to the first user (overlaid onto the HMD) during the first time period, but may also be used to modify a symbol to be displayed to another user who is viewing the same background environment (at the same location) during a subsequent time period, such as several days, weeks or months later. For example, information relating to the color-attribute of a particular background environment viewed by an earlier user, such as the location and the LOS of the earlier user and the determined color-attribute of the viewed background, as well as information relating to a visual alteration of a symbol displayed to the earlier user, may be used to facilitate or expedite the determination of a potential incompatibility condition relating to a symbol intended to displayed to a second user viewing the same background environment at a later time. Accordingly, the determination and comparison of color-attributes may be based on information obtained from a plurality of users, having viewed the same background environment at the same location at a plurality of earlier time periods, where the obtained information may be differentially weighted according to suitable criteria (e.g., the reliability of the information from the respective user; the type and effectiveness of the visual alteration performed for the respective user; the amount of time elapsed since the information was obtained; and the like). Information obtained from multiple users may be stored in one or more servers and/or databases accessible by the respective systems of other users, such as in a cloud storage architecture, forming a network of users for mutual enhancement of displayed foreground symbol modification.

A particular background environment may be perceived differently depending on the time at which it is viewed as well as the LOS of the viewer. For example, an outside scene viewed in the early morning, e.g., at sunrise, would be perceived differently than the same scene viewed in the late afternoon or evening of the same day, e.g., at sunset, due to the different influences of sunlight on the background scene during morning and evening. Similarly, a background scene viewed in the early morning, e.g., at sunrise, from an eastward direction, would be perceived differently than the same scene viewed at the same time (early morning) from a westward or northward or southward direction, as the sunlight influences the perception of the background differently from different viewing angles. Accordingly, the determination of the background color-attribute, and subsequent determination of a potential incompatibility with a foreground symbol to be displayed and visual alteration of the symbol, may be based on: the geographic location of the background scene, the time at which the background scene is viewed, and the LOS of the viewer, accounting for the interactions of each of these factors on the viewer perception.

The visual alteration of the foreground symbol to minimize the incompatibility condition may include displaying at least a portion of the symbol at an alternate display location over the background. In such a scenario, the shifting location of the displayed foreground symbol may be determined in accordance with additional characteristics of the symbol besides its color-attributes. For example, the size, shape, fill pattern, content, and other non-color characteristics of the symbol may be analyzed to help determine an optimal alternate location for displaying the symbol overlaid on the background environment (i.e., different from the original display location), so as to enhance viewer perception of the shifted symbol.

The foreground symbol may be displayed in accordance with the physical characteristics of the HMD display screen. The visual alteration of the symbol to minimize incompatibility with the background may further account for the particular HMD device worn by the user, such as the technical specification of an HMD visor or goggles, to ensure that the user perceives the symbol with the intended visual alteration when viewed through that HMD device. For example, the visual alteration of the displayed symbol may be modified based on HMD characteristics, including but not limited to: type of see-through display and ocularity, shape and size of the display; transparency; resolution; field of view, focal distance; latency; optical distortions and aberrations; and/or other relevant parameters which may influence the view through that particular HMD. The characteristics of the display device may be fixed or predetermined, or alternatively may be dynamic or adaptive, in which case the characteristics may be monitored to allow the displayed symbol to be modified accordingly in real-time. For example, certain characteristics of the display device, such as the level of transparency, may be different when viewing the display device indoors as opposed to outdoors.

According to an embodiment of the present invention, system 100 may utilize prediction data for determining whether and how to update a foreground image to be displayed. In particular, system 100 may predict a future location of user 102, based on information obtained from LMU 116 and LOS detector 110 (and/or other data sources), and predict a future background environment on which an intended symbol (or other foreground image) is to be projected on display 106. System 100 may then generate a visually altered form of the intended symbol, if an incompatibility condition is detected between the intended symbol and the predicted background environment, to be used if necessary, even before performing a color analysis of a real-time camera image or model-based image. For example, if user 102 is piloting an aircraft, system 100 may determine that the aircraft is currently flying above a mountain region but will soon be passing over an ocean, using location data and flight trajectory data relating to the aircraft (e.g. based on information obtained from LMU 116, 3D model 122, and/or aircraft navigational systems). Accordingly, system 100 may prepare a visually altered form of the intended symbol to be suitable for displaying onto an ocean background rather than a mountain background, to be applied once the aircraft reaches the relevant location.

System 100 may also predict the user location dynamically, while taking into account changing environmental conditions in real-time, such as changing background colors at the location. For example, a first user 102A may upload a series of images to database 120 while walking along a particular street section of an urban area during a certain day. The uploaded images include metadata linking the images with relevant parameters (e.g., scene location; lighting and weather conditions during image capture; time and date of image capture). A second user 102B may be walking along the same street section during the following day. Processor 108 may then determine the real-time background environments of the second user 102B, over which an intended symbol is to be displayed to the second user 102B, based on the images of the street section captured the previous day by the first user 102A. For example, system 100 may be projecting symbology onto a see-through HMD 106 worn by the second user 102B, who maintains an external view of the background environment. The projected symbology is characterized by certain color attributes, such as an orange symbol (e.g., representing navigational instructions or general information relating to features in the environment). Using information from database 120 (e.g., the images of the same street section captured by first user 102A), as well as LMU 116 and LOS detector 110, processor 108 may determine that second user 102B is about to reach a building with a color attribute that is incompatible with the projected symbol, such as a brown building. System 100 may then project a visually altered form of the symbol at the moment when the second user 102B has reached (and his LOS is directed at) the brown building, such as by changing the symbol from orange to white. Processor 108 may also utilize relevant environmental information, such as the time and date or weather conditions, in dynamically determining or predicting a potential incompatibility condition of a background environment. Such environmental information may be obtained from image metadata stored in database 120 and/or from external data sources (e.g., an ambient light detector; an internal clock; a weather application source; and the like). For example, processor 108 may determine that the image(s) of the brown building were captured by the first user 102A during daytime and/or bright and sunny conditions, whereas the second user 102B will be present at the same building during nighttime or dark/overcast weather conditions, and thus, the intended orange symbol can be projected over the view of the building (e.g., perceived as a "black" background by the second user 102B) without resulting in an incompatibility. In yet another example, processor 108 may determine from images captured by a first user 102A that a background location along the street section is characterized by a first color-attribute (e.g., red), while other images captured by other users 102 indicate that the same background location has a different color-attribute (e.g., white). Processor 108 may further determine that the images were captured by the first user 102A while the relevant background location was obscured by a certain object (e.g., a red car passing by), and that the "true" background color-attribute is that provided by the other images. Processor 108 thus determines that the second color-attribute of the background location would be relevant for the real-time environmental conditions of the second user 102B, and perform the color analysis for second user 102B accordingly.

According to yet a further embodiment of the present invention, system 100 may store information relating to an implemented visual alteration of a symbol with respect to a background environment. For example, the stored information (e.g., metadata) may include: the user location, the time and date, the ambient lighting, and other environmental conditions present when the visual alteration took place. The visual alterations may also be linked to a qualitative metric, which may be based on an ensuing image analysis of the visually altered symbol by processor 108 and/or based on feedback from users 102. Such information may thus define "a color-attribute adjustment function" linking different types of visual alterations to various parameters and conditions, which may be saved in database 120 and/or sent directly to user 102. Processor 108 may utilize such a color-attribute adjustment function for future visual alterations when a subsequently detected color-attribute incompatibility is characterized by at least some of the same conditions as the previous one (e.g., when the same user 102 or a different user 102 is present at a substantially similar geographic location and has a substantially similar LOS). Processor 108 may further utilize such a color-attribute adjustment function in real-time, for visual adjustments relating to other users 102 that are located in the same vicinity. For example, the color-attribute adjustment function may be applied to a common flight route, by linking different color adjustments to different geolocations along the flight route, and then utilized during subsequent flights by users 102 taken along the same flight route. In this manner, system 100 may perform subsequent visual adjustment of symbols with respect to background environments without necessarily performing color analysis on a camera image or 3D model-based image, which may serve to optimize processing and accelerate response time.

Figure 5:
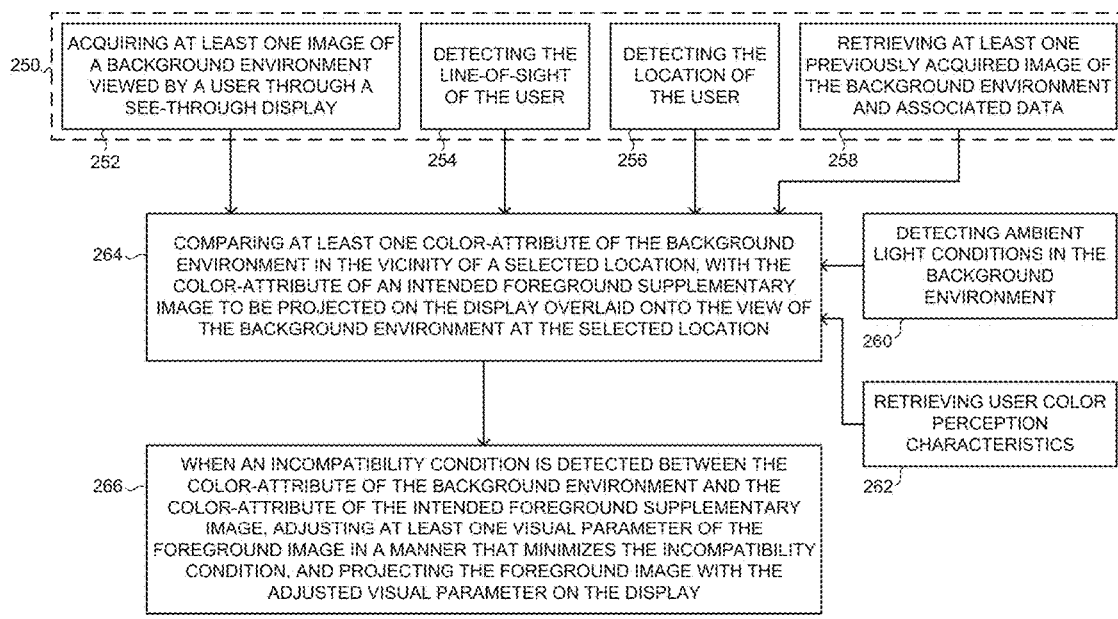
FIG. 5 is a flow diagram of a method for enhancing the visual perception of augmented reality presentation, operative in accordance with an embodiment of the present invention.

Reference is now made to FIG. 5, which is a flow diagram of a method for enhancing the visual perception of augmented reality presentation, operative in accordance with an embodiment of the present invention. In procedure 250, information relating to a background environment viewed by a user through a see-through display is obtained. Procedure 250 may be implemented via at least one of sub-procedures 252, 254, 256 and 258.

In sub-procedure 252, at least one image of a background environment viewed by a user through a see-through display is acquired. Referring to FIGS. 1, 2A and 2B, camera 104 captures an image 210 of an image region 202 of scene 200 viewed by user 102 through a see-through display 106. Image region 202 includes at least the environmental features in the vicinity of a selected object (tree 204), on which a supplemental foreground image (symbol 206) is to be superimposed on display 106.

In sub-procedure 254, the LOS of the user is detected. Referring to FIG. 1, LOS detector 110 determines the general line-of-sight of user 102, based on the position and orientation of the head of user 102 as determined by head tracker 112, and/or based on the eye gaze direction of user 102 as determined by eye tracker 114.

In sub-procedure 256, the location of the user is detected. Referring to FIG. 1, LMU 116 determines the global position and orientation coordinates of user 102 with respect to a reference coordinate system.

In sub-procedure 258, at least one previously acquired image of the background environment and associated data is retrieved. Referring to FIGS. 1 and 2A, processor 108 determines the real-world scene 200 being viewed by user 102 based on the position/orientation coordinates of user 102 (as obtained from LMU 116) and the LOS of user 102 (as obtained from LOS detector 110), and retrieves or generates a synthetic color image of the determined scene 200 from database 120. The images may be obtained from a 3D geographic model 122. The images may alternatively be obtained from a set of images of scene 200 captured previously by multiple users 102 at varying imaging parameters and environmental conditions. It is noted that the images may be captured and uploaded to database 120 substantially in real-time by other users 102 in the vicinity of scene 200. Processor 108 may further obtain metadata that indicates relevant parameters associated with the acquired images (e.g., scene location; lighting and weather conditions during image capture; time and date of image capture). Processor 108 may further extract relevant color-attributes of the background environment of scene 200 from the previously acquired images stored in database 120.

In optional procedure 260, ambient light conditions are detected in the background environment. Referring to FIGS. 1 and 2A, camera 104 or an alternative ambient light detector (not shown) is used to provide an indication of the level of ambient light in scene 200, particularly in the vicinity of selected object 204 (e.g., image regions 214, 216). The ambient light conditions may influence how a user 102 perceives certain color combinations. More generally, any relevant environmental information relating to the background environment may also be obtained from available data sources, such as for example: time and date information (e.g., from an internal clock and/or image timestamp); weather or climate information (e.g., from a weather application source and/or image metadata); and the like.

In optional procedure 262, user color perception characteristics are retrieved. Referring to FIG. 1, database 120 may include personalized information associated with different users, such as individualized sets of color perception characteristics. The personalized information may include or be based on user feedback, such as user responses to simulations of various color patterns and combinations, and/or feedback relating to the user's perception of previous foreground image and background image color combinations displayed by system 100. The personalized information may also include or be based on characteristics of the eyes or eyesight of the user, which may be obtained from eye tracker 114. The personalized information may be obtained or updated by artificial intelligence techniques used to automatically learn the color perception characteristics of different users based on the user feedback and historical data.

In procedure 264, at least one color-attribute of the background environment in the vicinity of a selected location is compared with the color-attribute of an intended foreground supplementary image to be projected on the display overlaid onto the view of the background environment at the selected location. Referring to FIGS. 1 and 2B, processor 108 compares the color-attributes of the environmental features of scene 200 located within the vicinity of object 204 (i.e., within image region 212), with the color-attributes of the intended symbol 206. The color-attributes may include at least one of: color value, brightness, hue, saturation, chromaticity, radiance, luminance, and/or any other relevant characteristic or attribute that may affect the visual perception of a viewer. Referring to FIG. 3A, object 204 is characterized by (at least) the color-attribute "CLR-A" in image region 216 where symbol 220 is to be overlaid, while symbol 220 is also characterized by (at least) the same color-attribute "CLR-A". Processor 108 may optionally take into account the ambient light conditions and/or other relevant environmental conditions in scene 200 (procedure 260), and/or the personalized user information (procedure 262), when determining if an incompatibility exists. Processor 108 may also dynamically predict a future user location, and then determine a potential incompatibility condition between the foreground image and a background environment at the predicted location. The dynamic prediction may be based on previously acquired images and metadata stored in database 120, data from LMU 116, as well as environmental information obtained from the image metadata and/or from external data sources, allowing for changing environmental conditions (e.g., resulting in different color-attributes at the predicted location) to be taken into account in real-time.

In procedure 266, when an incompatibility condition is detected between the color-attribute of the background environment and the color-attribute of the intended foreground supplementary image, at least one visual parameter of the foreground image is adjusted in a manner that minimizes the incompatibility condition, and the foreground image is projected on the display with the adjusted visual parameter. Referring to FIGS. 1 and 3A, processor 108 determines that symbol 220 is incompatible with image region 216 of object 204, as they are both characterized by a common color-attribute (CLR-A), and generates a visually altered form of symbol 220. The visual alteration of symbol 220 may involve changing the color entirely or adjusting the color shading or hue/brightness/saturation level. Referring to FIG. 3B, an updated symbol 222 with a different color-attribute "CLR-C" is displayed overlaid over object 204 (e.g., an orange or yellow symbol 222, rather than a green symbol 220, overlaid onto a green object 204). An alternative visual alteration of symbol 220 involves providing a bolded or highlighted border. Referring to FIG. 3C, an updated symbol 224 with a bolded or different colored border region is displayed overlaid over object 204 (for example, symbol 224 has a yellow border while maintaining a green interior, and is overlaid onto the green object 204). A further alternative visual alteration of symbol 220 involves projecting onto a different image location with respect to object 204. Referring to FIG. 3D, an updated symbol 226 is projected at a shifted location, shifted toward the upper right from the center of object 204, such that the majority of the (e.g., green) symbol 226 is displayed overlaid onto the (e.g., white) background of image region 214, rather than over (e.g., green) object 204. The visually altered symbol (222, 224, 226) may be projected onto display 106 in accordance with the LOS of user 102, as determined by LOS detector 110.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A method for enhancing the visual perception of augmented reality presentation, the method comprising the procedures of:
    detecting the location of a user, with a location measurement unit;
    detecting the line-of-sight (LOS) of the user, with a line-of-sight detector;
    determining a background environment viewed by the user through a see-through head-mounted display (HMD), based on at least the detected location and the detected LOS;
    determining at least one color-attribute of the background environment at a background location corresponding to a LOS of the user, the color-attribute determined using information obtained from at least another see-through HMD viewed by another respective user present at the background location prior to the user;
    comparing the determined color-attribute of the background environment at the background location with at least one color-attribute of a foreground supplementary image of a symbol, a text, or graphic or visual imagery, to be displayed on the HMD overlaid onto the view of the background environment at the background location; and
    when an incompatibility condition is detected between the determined color-attribute of the background environment and the color-attribute of the foreground supplementary image, adjusting at least one visual parameter of the supplementary image in a manner that minimizes the incompatibility condition, and displaying the supplementary image with the adjusted visual parameter on the HMD at the background location.

2. The method of claim 1, wherein the information obtained from the at least another HMD comprises at least: the location of the another user; the LOS of the another user; and the color-attribute of the background environment viewed by the another user at a prior time.

3. A system for enhancing the visual perception of augmented reality presentation, the system comprising:
    a see-through head-mounted display (HMD), worn by a user, the HMD configured to enable the user to view a background environment, and to display foreground imagery overlaid onto the view of the background environment;
    a location measurement unit, configured to detect the location of the user;
    a line-of-sight detector, configured to detect the line-of-sight (LOS) of the user; and
    a processor, coupled with the HMD, with the location measurement unit and with the line-of-sight detector, the processor configured to determine a background environment viewed by the user through the HMD, based on at least the detected location and the detected LOS, the processor further configured to determine at least one color-attribute of the background environment at a background location corresponding to a LOS of the user the color-attribute determined using information obtained from at least another see-through HMD viewed by another respective user present at the background location prior to the user, the processor further configured to compare the determined color-attribute of the background environment at the background location with at least one color-attribute of a foreground supplementary image of a symbol, a text, or graphic or visual imagery, to be displayed on the HMD overlaid onto the view of the background environment at the background location, and when an incompatibility condition is detected between the determined color-attribute of the background environment and the color-attribute of the foreground supplementary image, the processor is further configured to adjust at least one visual parameter of the supplementary image in a manner that minimizes the incompatibility condition, such that the supplementary image is displayed with the adjusted visual parameter on the HMD at the background location.

4. The system of claim 3, wherein the information obtained from the at least another HMD comprises at least: the location of the another user; the LOS of the another user; and the color-attribute of the background environment viewed by the another user at a prior time.

5. The system of claim 3, wherein the supplementary image with the adjusted visual parameter is displayed in accordance with physical characteristics of the HMD display screen, such that the perceived color-attributes of the supplementary image as perceived through the HMD display screen is consistent with the intended color-attributes of the supplementary image.

6. A method for enhancing the visual perception of augmented reality presentation, the method comprising the procedures of:
    detecting the location of a user, with a location measurement unit;

detecting the line-of-sight (LOS) of the user, with a line-of-sight detector;

determining a background environment viewed by the user through a see-through head-mounted display (HMD), based on at least the detected location and the detected LOS;

determining at least one color-attribute of the background environment at a background location corresponding to a LOS of the user;

comparing the determined color-attribute of the background environment at the background location with at least one color-attribute of a foreground supplementary image of a symbol, a text, or graphic or visual imagery, to be displayed on the HMD overlaid onto the view of the background environment at the background location; and when an incompatibility condition is detected between the determined color-attribute of the background environment and the color-attribute of the foreground supplementary image, adjusting at least one visual parameter of the supplementary image in a manner that minimizes the incompatibility condition, by displaying at least a portion of the supplementary image at an alternate background location determined in accordance with at least one non-color characteristic of the supplementary image.

7. A system for enhancing the visual perception of augmented reality presentation, the system comprising:

a see-through head-mounted display (HMD), worn by a user, the HMD configured to enable the user to view a background environment, and to display foreground imagery overlaid onto the view of the background environment;

a location measurement unit, configured to detect the location of the user;

a line-of-sight detector, configured to detect the line-of-sight (LOS) of the user; and a processor, coupled with the HMD, with the location measurement unit and with the line-of-sight detector, the processor configured to determine a background environment viewed by the user through the HMD, based on at least the detected location and the detected LOS, the processor further configured to determine at least one color-attribute of the background environment at a background location corresponding to a LOS of the user, the processor further configured to compare the determined color-attribute of the background environment at the background location with at least one color-attribute of a foreground supplementary image of a symbol, a text, or graphic or visual imagery, to be displayed on the HMD overlaid onto the view of the background environment at the background location, and when an incompatibility condition is detected between the determined color-attribute of the background environment and the color-attribute of the foreground supplementary image, the processor is further configured to adjust at least one visual parameter of the supplementary image in a manner that minimizes the incompatibility condition, by displaying at least a portion of the supplementary image at an alternate background location determined in accordance with at least one non-color characteristic of the supplementary image.

* * * * *